United States Patent
Neuman

(10) Patent No.: US 8,145,739 B2
(45) Date of Patent: Mar. 27, 2012

(54) METHOD OF ANALYZING NON-PREEMPTIVE DRAM TRANSACTIONS IN REAL-TIME UNIFIED MEMORY ARCHITECTURES

(75) Inventor: Darren Neuman, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1026 days.

(21) Appl. No.: 12/049,905

(22) Filed: Mar. 17, 2008

(65) Prior Publication Data

US 2008/0168456 A1 Jul. 10, 2008

Related U.S. Application Data

(62) Division of application No. 10/218,811, filed on Aug. 14, 2002, now Pat. No. 7,849,172.

(60) Provisional application No. 60/361,143, filed on Mar. 1, 2002.

(51) Int. Cl.
G06F 15/173 (2006.01)

(52) U.S. Cl. ........ 709/223; 709/225; 709/226; 711/106; 711/100

(58) Field of Classification Search .................. 709/225, 709/226, 223; 711/105, 100
See application file for complete search history.

(56) References Cited

U.S. PATENT DOCUMENTS

| | | | | |
|---|---|---|---|---|
| 5,272,701 A * | 12/1993 | Tsuruoka | ...................... | 370/252 |
| 5,301,333 A * | 4/1994 | Lee | .................. | 710/244 |
| 5,887,143 A | 3/1999 | Saito et al. | | |
| 5,903,283 A | 5/1999 | Selwan et al. | | |
| 6,006,303 A | 12/1999 | Barnaby et al. | | |
| 6,009,473 A * | 12/1999 | Lowe | .............................. | 709/233 |
| 6,069,882 A * | 5/2000 | Zellner et al. | ................. | 370/329 |
| 6,078,998 A * | 6/2000 | Kamel et al. | ................... | 711/151 |
| 6,157,978 A | 12/2000 | Ng et al. | | |
| 6,189,064 B1 | 2/2001 | MacInnis et al. | | |
| 6,205,524 B1 | 3/2001 | Ng | | |
| 6,343,351 B1 * | 1/2002 | Lackman et al. | .............. | 711/158 |
| 6,378,052 B1 * | 4/2002 | Genduso et al. | .............. | 711/158 |
| 6,442,648 B1 * | 8/2002 | Genduso et al. | .............. | 711/112 |
| 6,473,821 B1 | 10/2002 | Altmayer et al. | | |
| 6,498,798 B1 | 12/2002 | Krishnamoorthy et al. | | |
| 6,611,908 B2 | 8/2003 | Lentz et al. | | |
| 6,801,943 B1 * | 10/2004 | Pavan et al. | .................... | 709/226 |
| 6,804,758 B2 * | 10/2004 | Liao et al. | ...................... | 711/169 |
| 6,842,807 B2 * | 1/2005 | Sadowsky et al. | ............ | 710/116 |
| 6,871,011 B1 * | 3/2005 | Rahman et al. | ................ | 386/293 |
| 6,877,072 B1 * | 4/2005 | Dias et al. | ...................... | 711/151 |
| 6,895,585 B2 * | 5/2005 | Smith | ............................ | 718/103 |
| 6,980,562 B2 * | 12/2005 | Rudolf et al. | .................. | 370/462 |

(Continued)

OTHER PUBLICATIONS

Sha, L., et al. "Priority Inheritance Protocols: An Approach to Real-Time Synchronization," IEEE Transactions on Computers, Sep. 9, 1990, pp. 1175-1185, No. 9, New York.

(Continued)

*Primary Examiner* — Ramsey Refai

(74) *Attorney, Agent, or Firm* — Thomas, Kayden, Horstemeyer & Risley, LLP.

(57) ABSTRACT

Systems and methods are disclosed for non-preemptive DRAM transactions. More specifically, the present invention relates to improvements in non-preemptive DRAM transactions in real-time unified memory architectures. One embodiment of the present invention relates to a method for determining access to non-preemptive DRAM devices. This method comprises determining real time need for access to the device and prioritizing access using a rate monotonic scheduling.

20 Claims, 12 Drawing Sheets

U.S. PATENT DOCUMENTS

| | | | |
|---|---|---|---|
| 2001/0056482 A1 | 12/2001 | Lewis et al. | |
| 2002/0120763 A1 | 8/2002 | Miloushev et al. | |
| 2002/0143847 A1* | 10/2002 | Smith | 709/103 |
| 2003/0061260 A1* | 3/2003 | Rajkumar | 709/104 |

OTHER PUBLICATIONS

Parks, T., et al., "Non-Preemptive Real-Time Scheduling of Dataflow Systems," Department of Electrical Engineering and Computer Sciences, 1995, pp. 3235-3238, Berkeley, California.

Liu, J.W.S., "Real-Time Systems," Prentice-Hall, 2000, 309 pages, Upper Saddle River, New Jersey.

Liu, C.L., et al., "Scheduling Algorithms for Multiprogramming in a Hard Real-Time Environment," Journal of the Association for Computing Machinery (ACM), Jan. 1973, vol. 20, No. 1, pp. 46-61.

Leung, J.Y.T., et. al., "On the Complexity of Fixed-Priority Scheduling of Periodic, Real-Time Tasks," Performance Evaluation 2, 1982, vol. 2, pp. 237-250, North-Holland Publishing Company.

Audsley, N.C., et al., "Hard Real-Time Scheduling: the Deadline Monotonic Approach," Department of Computer Science, 1992, pp. 127-132, University of York, England.

* cited by examiner

FIG. 3
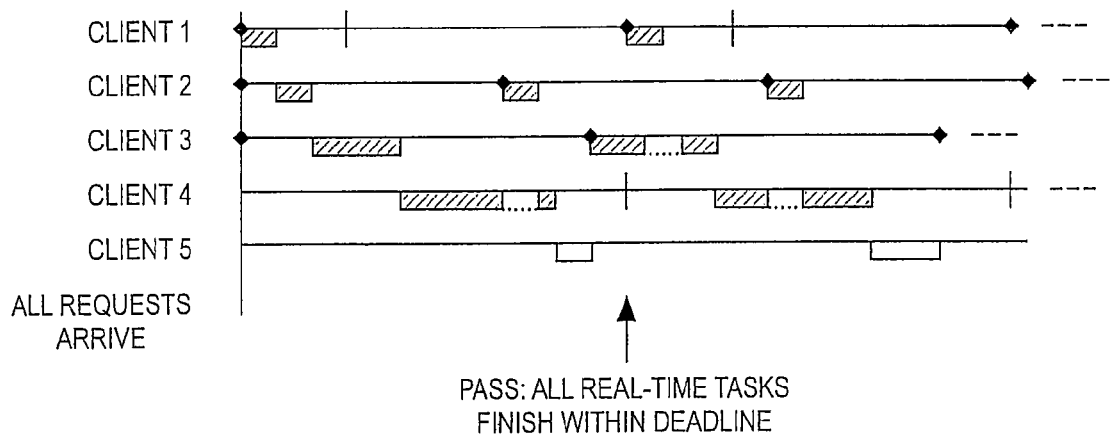
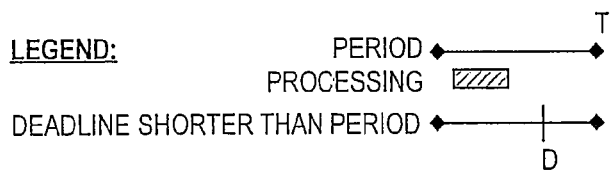
FIG. 4a
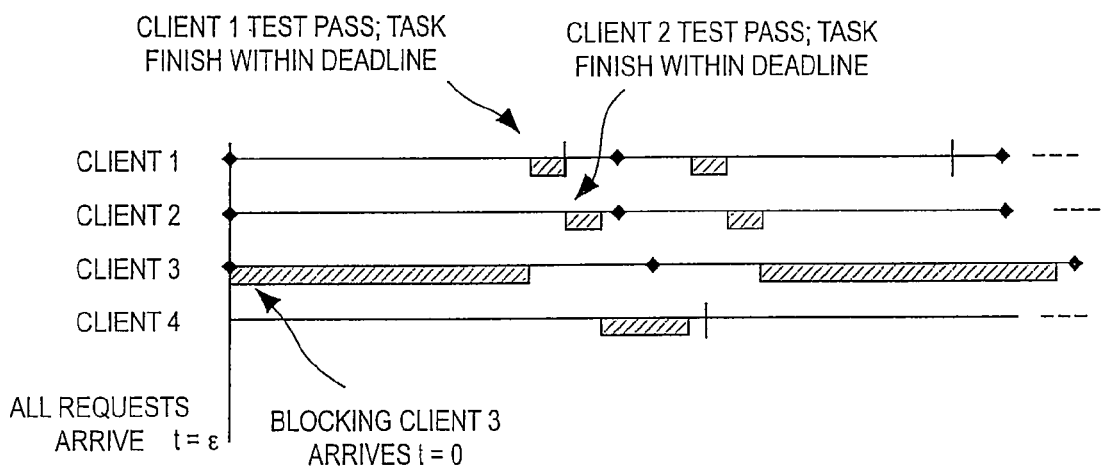
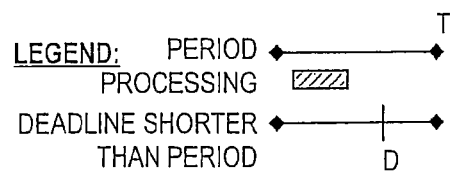

METHOD OF ANALYZING NON-PREEMPTIVE DRAM TRANSACTIONS IN REAL-TIME UNIFIED MEMORY ARCHITECTURES

CROSS-REFERENCE TO RELATED APPLICATIONS

The present application is a divisional of U.S. patent application Ser. No. 10/218,811 filed Aug. 14, 2002, which claims the benefit of the filing date of U.S. Provisional Patent Application 60/361,143, entitled "IMPROVEMENTS TO NON-PREEMPTIVE DRAM TRANSACTIONS IN REAL-TIME UNIFIED MEMORY ARCHITECTURES," filed Mar. 1, 2002, which is hereby expressly incorporated herein by reference in its entirety.

The present application is related to U.S. patent application Ser. No. 10/218,533, entitled "SYSTEM AND METHOD FOR ARBITRATING CLIENTS IN A HIERARCHICAL REAL-TIME DRAM SYSTEM," and filed on Aug. 14, 2002.

BACKGROUND OF THE INVENTION

The present invention relates to DRAM transactions. More specifically, the present invention relates to improvements in non-preemptive DRAM transactions in real-time unified memory architectures.

The problem of selecting which client gains access to DRAM is the same basic problem as solved in real time systems commonly used for scheduling tasks on a CPU, or scheduling access to a shared hardware resource. The theories in this area have been under development since the early 70's, and are reasonably advanced. While there are a number of approaches to scheduling, the simplest and possibly most robust is a static priority based schedule based on Rate Monotonic Scheduling.

Information about scheduling may be found in Janet Liu "Real-Time Systems", Prentice-Hall (2000); Liu, C. L. and J. W. Layland, "Scheduling Algorithms for Multiprogramming in a Hard Real-Time Environment", *J. Assoc. Computing Machinery (ACM)*, vol. 20, pp. 46-61, 1973; Leung J. Y. T. and J. Whitehead, "On the Complexity of Fixed-Priority Scheduling of Periodic, Real-Time Tasks", *Performance Evaluation (Netherlands)*, vol. 2, pp. 237-250, 1982; Audsley, N. C., A. Burns, M. F. Richardson and A. J. Wellings, "Hard Real-Time Scheduling: the Deadline Monotonic Approach", pp. 127-132 in *Real-time Programming*, ed. W. A. Halang and K. Ramamritham, Pergamon Press, 1992; and commonly assigned U.S. Pat. No. 6,189,064, the complete subject matter of each of which is incorporated herein by reference in its entirety.

In certain unified memory architecture systems, the memory controller is not interrupted while the memory is serving a client device, even if a request for service is received from a higher priority client during the servicing of the lower priority client. Such a system is referred to as a non-preemptive system. Non-preemption allows the page efficiency of the memory controller accessing DRAM to remain relatively high. Non-preemption has no effect on the determination of priorities of client devices in a rate-monotonic scheduling system. However, the critical instant analysis is affected in a number of areas, which must be handled correctly.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in non-preemptive DRAM transactions. More specifically, the present invention relates to improvements in non-preemptive DRAM transactions in real-time unified memory architectures.

One embodiment of the present invention relates to a method of analyzing the schedulability of a non-preemptive system that employs rate monotonic scheduling to determine access priority of a plurality of client devices to a common resource. Pursuant to the method, it is determined which client device having a lower priority than a preselected one of the client devices has the longest service time. The lower priority client device having the longest service time is serviced by the common resource. After servicing the lower priority device having the longest service time, the rest of the plurality of client devices are serviced in rate-monotonic priority order. The system is declared unschedulable if any of the client devices are not completely serviced by their respective service deadlines.

Another embodiment of the present invention relates to a method of analyzing the schedulability of a non-preemptive system that employs rate monotonic scheduling to determine access priority of a plurality of client devices to a common resource. According to this method, a schedulability test is performed for each of the client devices. Each schedulability test involves determining which client device having a lower priority than the present client device has the longest service time and then servicing that lower priority client device having the longest service time. After servicing the lower priority device having the longest service time, the rest of the plurality of client devices are serviced in rate-monotonic priority order. The system is declared unschedulable if any of the client devices are not completely serviced by their respective service deadlines. The schedulability test for a given client device is satisfied if all of the client devices are completely serviced by their respective service deadlines. The system is declared schedulable if the schedulability test for each of the client devices is satisfied.

Another embodiment of the present invention is directed to another method of analyzing the schedulability of a non-preemptive system that employs rate monotonic scheduling to determine access priority of a plurality of client devices to a common resource. Pursuant to this method, the processing time of a client device determined by rate monotonic scheduling to be the highest priority client device is determined. The shortest service deadline of the highest priority client device is also determined. The longest processing time of the plurality of client devices other than the highest priority client device is also determined. The system is declared unschedulable if the sum of the processing time of the highest priority client device and the longest processing time of the plurality of client devices other than the highest priority client device is greater than the shortest deadline of the highest priority client device.

Yet another embodiment of the present invention is related to a method of analyzing the schedulability of a non-preemptive system that employs rate monotonic scheduling to determine access priority of a plurality of client devices to a common resource. According to the method, the shortest service deadline of a preselected one of the client devices is determined. The longest processing time of any of the plurality of client devices having a lower priority than the preselected device according to rate monotonic scheduling is also determined. The processing times of all of the client devices having a higher priority than the preselected device are added together to obtain a combined processing time of the higher priority devices. The system is declared unschedulable if the sum of the longest processing time of the client devices having a lower priority than the preselected device and the combined processing time of the higher priority client devices is greater than the shortest deadline of the preselected client device.

Another embodiment of the present invention is directed to a method of determining an effective service deadline of a client device in a system that employs rate monotonic scheduling to determine access priority of a plurality of client devices to a common resource. The method comprises determining the actual service deadline of the client device and determining the total communication delay between the client device and the shared resource. The total communication delay is subtracted from the actual service deadline to obtain an effective service deadline.

Still another embodiment of the present invention is directed to a method of analyzing the schedulability of a system that employs rate monotonic scheduling to arbitrate the access of a plurality of client devices to a common resource, wherein the system initiates an arbitration when a previously arbitrated command is issued to the common resource for processing. According to this method, it is determined which two client devices having a lower priority than a preselected one of the client devices has the longest service time. The two lower priority client devices having the longest service times are serviced by the common resource. After servicing the two lower priority devices having the longest service time, the rest of the plurality of client devices are serviced in rate-monotonic priority order. The system is declared unschedulable if any of the client devices are not completely serviced by their respective service deadlines.

These and other advantages and novel features of the present invention, as well as details of an illustrated embodiment thereof, will be more fully understood from the following description and drawings.

BRIEF DESCRIPTION OF THE DRAWINGS

FIG. 3 is a timeline representing a simple critical instant analysis in accordance with an illustrative embodiment of the present invention.

FIGS. 4a-4c are timelines representing a simple critical instant analysis in accordance with an illustrative embodiment of the present invention.

DETAILED DESCRIPTION OF THE INVENTION

The following description is made with reference to the appended figures.

Improvements to memory fabrication technologies have resulted in denser memory chips. However memory chip bandwidth has not been increasing as rapidly. The bandwidth of a memory chip is a measure of how fast contents of the memory chip can be accessed for reading or writing. As a result of increased memory density without necessarily a commensurate increase in bandwidth, in many conventional system designs multiple memory devices are used for different functions, and memory space in some memory modules may go unused or is wasted. In one embodiment of the present invention, a unified memory architecture is used. In the unified memory architecture, all the tasks (also referred to as "clients"), including CPU, display engine and IO devices, share the same memory.

The unified memory architecture may include a memory that is shared by a plurality of devices, and a memory request arbiter coupled to the memory, wherein the memory request arbiter performs real time scheduling of memory requests from different devices having different priorities. The unified memory system assures real time scheduling of tasks, some of which do not inherently have pre-determined periodic behavior and provides access to memory by requesters that are sensitive to latency and do not have determinable periodic behavior.

Figure 1:
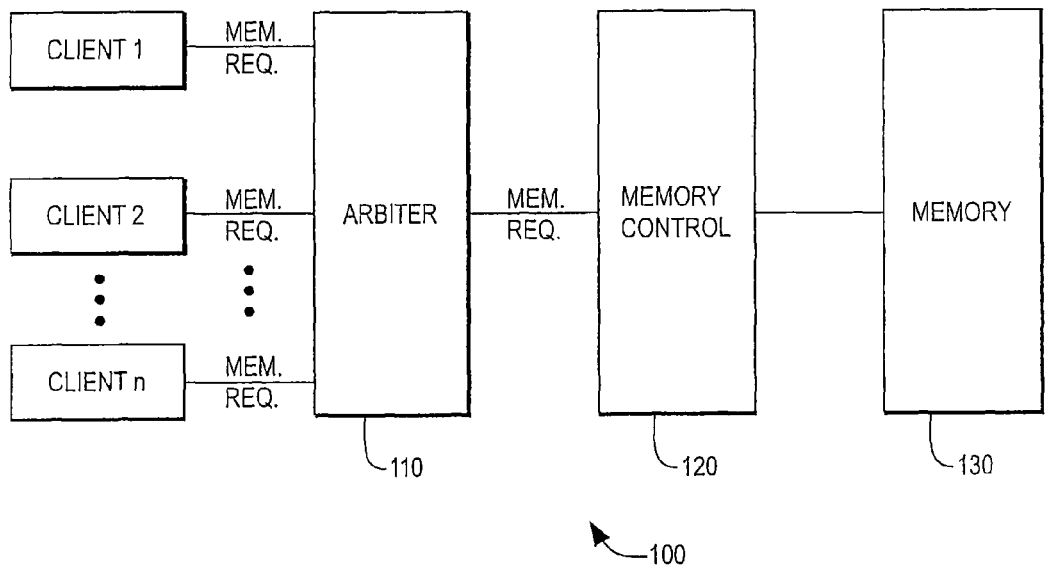
FIG. 1 is a functional block diagram representing a memory controller system according to an illustrative embodiment of the present invention.

FIG. 1 is a functional block diagram representing a memory controller system 100 according to an illustrative embodiment of the present invention. Memory requests are generated by client device 1, client device 2, and any number of additional client devices up to client device n. In an illustrative embodiment of the present invention one of the client devices is the CPU. These memory requests are provided to a memory access arbiter 110. The arbiter 110 arbitrates between/among requesting client devices to determine which client device will be granted access to memory at a given time. The arbiter 110 sends memory requests to a memory controller 120. In FIG. 1, the shared resource is the memory module 130. However, according to the present invention, the shared resource can be any device that serves as a resource to multiple client devices such as client devices 1-n.

The memory controller 120 sends address and control signals to a memory module 130 and receives data from the memory module 130. In an illustrative embodiment of the present invention, memory module 130 is a DRAM module. The memory controller preferably provides data received from the memory module 130 to a device that requested the received data.

The arbiter 110 uses an improved form of real time scheduling to meet real-time latency requirements while improving performance for latency-sensitive tasks. When using a unified memory, memory latencies caused by competing memory requests by different tasks should generally be addressed. In one embodiment, a real-time scheduling and arbitration scheme for unified memory is implemented, such that all tasks that use the unified memory meet their real-time requirements. The methodology used implements real-time scheduling using rate monotonic scheduling (RMS). Rate monotonic scheduling is a mathematical approach that allows the construction of provably correct schedules of arbitrary numbers of real-time tasks with arbitrary periods for each of the tasks. This methodology provides for a straightforward means for proof by simulation of the worst case scenario, and this simulation is simple enough that it can be done by hand.

In the simplest form, rate monotonic scheduling provides a means to prioritize clients based on their real-time needs. It also provides a test to determine if the system will pass or fail.

Critical information needed to implement this scheduling approach includes at least the following parameters describing the clients: (1) client devices are periodically requesting DRAM at a fixed rate T; (2) clients need a response from memory within the time of the next request (time+T); and (3) assumptions about the clients, such as independence and preemption.

RMS, as normally applied, makes a number of simplifying assumptions in the creation of a priority list. In the normal RMS assumptions, all tasks are assumed to have constant periods, such that a request for service is made by the task with stated period, and all tasks have a latency tolerance that equals that task's period. Latency tolerance is defined as the maximum amount of time that can pass from the moment the task requests service until that task's request has been completely satisfied. The end of a client device's latency tolerance period is sometimes referred to as its service deadline. During implementation of one embodiment of the present invention, the above assumptions have been modified, as described below.

In the RMS method, all tasks are generally listed along with their periods. They are then ordered by period, from the shortest to the longest, and priorities are assigned in that order. Multiple tasks with identical periods can be in any relative order. In other words, the relative order amongst them can be decided by, for example, flipping a coin.

Proof of correctness, i.e. the guarantee that all tasks meet their deadlines, is constructed by analyzing the behavior of the system when all tasks request service at exactly the same time; this time is called the "critical instant". This is the worst-case scenario, which may not occur in even a very large set of simulations of normal operation, or perhaps it may never occur in normal operation, however it is presumed to be possible. As each task is serviced, it uses the shared resource, (memory clock cycles in the present invention) in the degree stated by that task. If all tasks meet their deadlines, the system is guaranteed to meet all tasks' deadlines under all conditions, since the critical instant analysis simulates the worst case.

When the lowest priority real-time task meets its deadline, without any higher priority tasks missing their deadlines, then all tasks are proven to meet their deadlines. As soon as any task in this simulation fails to meet its deadline, the test has failed and the task set cannot be guaranteed, and therefore the design should preferably be changed in order to guarantee proper operation under worst case conditions.

The simplest model of a critical instant has clear initial conditions, run-time conditions, and clear end conditions. In simple preemptive systems, the initial conditions are the same for all clients, so only one run of the model is needed. However, in non-preemptive systems, the test should be run for each client device, as will be described below. In a preemptive system, if a request is received from a higher priority client while a lower priority client is being serviced by the common resource, the arbiter 110 interrupts the processing of the lower priority client's request and provide access to the shared resource to the higher priority client. In a non-preemptive system, if a request is received from a higher priority client while a lower priority client is being serviced by the shared resource, the lower priority is allowed to complete its transaction with the common resource before the higher priority client is granted access to the resource.

The initial conditions specify the starting point of a simulation that stresses the worst case for a system. Determining the worst case starting point may be challenging when there are deviations from the assumptions underlying rate monotonic scheduling. For any client (i) in a simple preemptive system, the worst case occurs when all higher priority clients (<i) request simultaneously. The priorities in the system must be assigned according to period as indicated above for rate monotonic scheduling.

The run-time conditions for a critical instant simulation in accordance with one embodiment of the present invention assume that all high priority clients request continuously at their periodic rate. Each client is serviced immediately if it has the highest priority request. Lower priority clients are serviced only when all higher priority requests have been served. Lower priority clients are interrupted, to service higher priority clients (note that this rule is modified in a non-preemptive system). If a client's request is not serviced prior to the end of its period, then the critical instant simulation fails.

The simulation of the critical instant continues until the period (and deadline) for the client (i) is completed. If the client (i) has been serviced, then the simulation passes. If it has not finished being serviced, then the simulation has failed and the system is declared not schedulable. In an illustrative embodiment of the present invention, the critical instant simulation is run for all clients, as each client may have different initial conditions, and different end conditions for pass/fail test.

Figure 2:
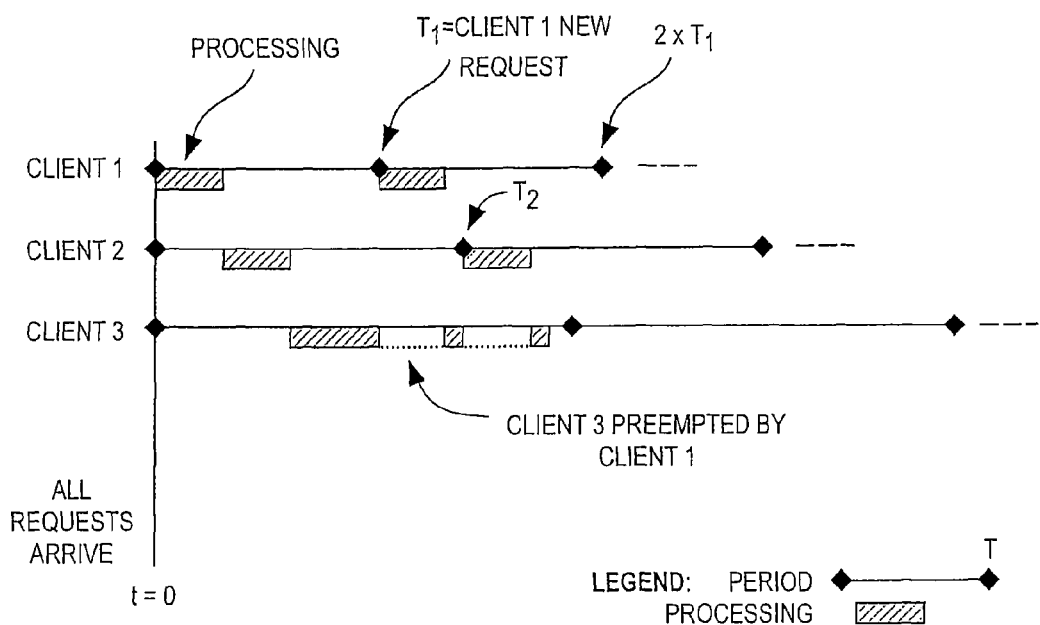
FIG. 2 is a timeline representing a simple critical instant analysis in accordance with an illustrative embodiment of the present invention.

FIG. 2 illustrates an example of a simple critical instant in a preemptive system. In the system represented in FIG. 2, all clients request periodically. Client 1 has the shortest period and therefore is assigned the highest priority. Client 3 has the longest period and is therefore assigned the lowest priority. At the critical instant, access requests arrive from all three clients at t=0. The arbiter 110 provides access to the shared resource first to client 1 because it has the highest priority. When client 1 completes its transaction with the common resource, i.e., when the shared resource is done servicing client 1, the arbiter grants access to client 2, which has the next highest priority. When client 2 has been serviced, servicing of client 3, the lowest priority client, commences. At time $T_1$, a new request is received from client 1, and because this is a preemptive system and client 1 has the highest priority, the servicing of client 3 is interrupted and client 1 is granted access to the common resource. When client 1's new request is completely serviced, access to the shared resource is returned to client 3.

At time $T_2$, a new request is received from client 2, and since client 2 has the higher priority, the servicing of client 3 is interrupted and client 2 is granted access to the common resource. When client 2's new request is completely serviced, access to the shared resource is returned to client 3. Client 3's transaction with the common resource is completed prior to its deadline at the end of its period. This is a successful end condition for the critical instant test for client 3. A test for critical instant for all three clients will show that this system is schedulable.

Note that if a system fails the test, and is not schedulable, changing the priorities will not fix it. The rate monotonic scheduling theory illustrates that the assigned priorities are optimal, so there are no improvements possible. The fix requires changes to hardware to improve the schedulability of the system.

The use of rate monotonic scheduling places design requirements on the clients that should be performed correctly for the entire system to work. A single ill-behaved client may cause the system to fail the schedulability test.

In the case of a failure, the ill-behaved client may be serviced, but a lower-priority client may be denied access to the common resource. Often times a failure in such a system does not show symptoms in the problematic module, but rather shows symptoms in low-priority modules, or in modules that do not degrade gracefully (hard failure).

In an illustrative embodiment of the present invention, the latency tolerance of a module is required to be equal to its requesting period. In an exemplary embodiment of the present invention wherein the shared resource is a DRAM module, a module that has regular accesses to DRAM incorporates a FIFO buffer that is 2× the size of the DRAM service burst. The FIFO generates a request to DRAM when it is half full. The client then relies upon the system to service the FIFO with the DRAM burst within the remaining time of a service period. If the client is reading from DRAM, the client must be designed so that it may operate for 1 service period with 1 burst of data in the FIFO. In the normal case, the FIFO is filled ahead of schedule, and the client will have more than one burst of data to work on. The client will not make additional requests if the FIFO is above the half full mark, so that there is no danger of the FIFO overflowing. In the critical instant, the client requests when the FIFO is half full. The client continues to operate on the half of the data that is in the FIFO, and the DRAM services and sends a burst to the FIFO just prior to the client emptying the FIFO. This maintains the FIFO at a level between half and nearly empty. For the purposes of critical instant analysis, the client is modeled to have the worst-worst-case behavior. This includes worst-case request rate, worst case page breaks, worst case size of DRAM transaction, etc.

The simulation of a critical instant generally indicates nothing about the bandwidth of a system. The critical instant analysis indicates if the system works in a real-time sense. That means that the real-time scheduling has been met, or has not been met. The simulation is a worst-worst case simulation, primarily to test the schedulability of the system with the rate-monotonic priority settings.

The system will not exhibit this worst-worst case behavior often, and additional bandwidth may be available when the system is not experiencing a critical instant. The critical instant is rare by design, so is not expected to happen often. However, if a system is designed to pass the critical instant, then it may operate in all normal modes of operation with regard to shared resource bandwidth.

There are a number of areas where real systems generally do not comply with the underlying assumptions of the rate monotonic scheduling approach.

Sporadic clients are those clients having no critical deadline. These are non-real-time clients, and are treated as low priority clients in the system. All real-time clients are prioritized above all sporadic clients. The sporadic clients do not have to pass a schedulability test from a critical Instant analysis. In one embodiment, a round robin mechanism is used to allocate spare bandwidth to non-real time clients, effectively as a sporadic server.

It is contemplated that it may be necessary to characterize sporadic client behavior carefully, as they do enter into the analysis of the critical instant in non-preemptive modeling. In the non-preemptive initial conditions, a sporadic client may block other clients.

It is possible to have clients who request access to the shared resource with real-time deadlines, but do not have a periodic behavior. They may request access very rarely, but upon request have a definite deadline that needs to be serviced. In one embodiment, these clients are prioritized according to their deadline, rather than period (assuming deadline <=period). This is then treated the same in the critical instant as other clients. According to deadline monotonic scheduling, the critical instant analysis utilizes the deadline of the clients rather than the period to test for schedulability. Additionally, the client cannot request more frequently than its deadline. In the run-time conditions of the critical instant analysis, these clients are simulated to make a new request at the end of their deadline. Essentially, they are treated as a normal client with regular requests at their deadline time.

Some clients may have a strict periodic request with a deadline that is shorter than the period. In this case, the deadline monotonic scheduling rules apply (i.e., priorities are assigned according to deadline, not period). The critical instant initial conditions are unchanged from rate monotonic approach. The run-time conditions of the critical instant simulation have this client repeat requests at the periodic rate T, but the pass/fail check of the test is based on meeting the deadline D as illustrated in FIG. 3.

FIG. 3 is a timeline depicting a critical instant analysis with various types of clients. In FIG. 3, client 1 has a deadline that is shorter than its period. Client 1 is assigned the highest priority because it has the shortest deadline. Clients 2 and 3 are "normal" clients having periodic requests and deadlines equal to their respective periods. Client 4 has deadlines, but is non-periodic in requesting. Thus client 4 is treated as the worst case wherein requests are initiated after every deadline. Therefore, client 4 is prioritized according to its deadline and its run-time period defaults to its deadline. Client 5 is a sporadic server. With no deadline, it receives the lowest priority. Client 5 utilizes available bandwidth after all other clients are served. In an illustrative embodiment, this bandwidth is allocated via a round-robin mechanism to non-real-time clients. A test for critical instant shows that all clients are serviced by their respective deadlines. Therefore, the system is declared schedulable.

Non-preemption in the memory controller 120, or other shared resource, is a very real issue that causes some problems with rate monotonic scheduling. In a non-preemptive system, the memory controller 120 is not interrupted in one service time to service a requesting client having a higher priority. Non-preemption allows the page efficiency of the memory controller accessing DRAM to remain efficient. Non-preemption has no impact on determining the priorities of the clients in the system. However, the critical instant analysis is affected in a number of areas, which are addressed by the present invention.

According to an embodiment of the present invention, the initial condition with non-preemption involves different initial conditions for each client. Also, according to an illustrative embodiment of the present invention, each client utilizes a separate critical instant simulation for that client. The memory controller 120 may be blocked with a low priority task at the moment the critical instant begins for a client. This may delay the servicing of higher priority clients until the low priority-blocking client finishes service. The blocking time in the worst case is defined by the longest service time for a client that has a lower priority than the client being tested for schedulability. Therefore, in the critical instant analysis, the lower priority client having the longest service time is assumed to begin its transaction with the shared resource at a time just prior to simultaneously receiving requests from all of the other client devices. Therefore, after waiting a period of time equal to the service time of the lower priority client having the longest service time, the remaining clients are then serviced in rate-monotonic order. As the critical instant is analyzed for each client, the blocking client may change, depending on where the client under test is located in the priority chain. In a system with non-real time clients or sporadic clients, these low priority clients may also block a high priority client, causing potential problems if they have long service times.

According to an illustrative embodiment of the present invention, the run-time condition with non-preemption requires different rules than for preemption. With non-preemption, each client is serviced in priority order, and is serviced until completion. This generally worsens the response time of the highest priority client, as lower priority clients will run completely before releasing the shared resource.

According to an exemplary embodiment of the present invention, the pass criteria for a pass/fail test of schedulability for a non-preemptive system are detected at the end of the first deadline for the client under test. If the client has been serviced, the test is a pass; else it is a failure.

With a preemptive system, at the end of the service time of the lowest priority client, it is clear whether the entire system is schedulable or not. This is a simplification of the schedulability test that is often taken in preemptive systems by running one set of initial conditions. It is contemplated that this shortcut cannot be taken with non-preemptive systems. Each client may have different initial conditions and different run-time conditions. It is possible to have low priority clients pass a schedulability test in the critical instant and to have a higher priority client fail, or vice versa. Therefore, according to the present invention, the worst case critical instant conditions are set up and the critical instant analysis is run for every client until the end conditions indicate pass/fail.

Figure 4B:
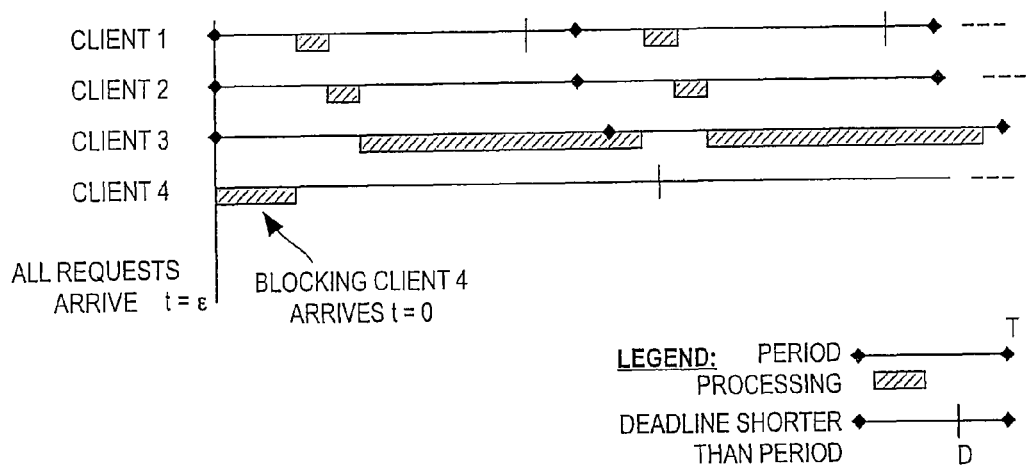
Figure 4C:
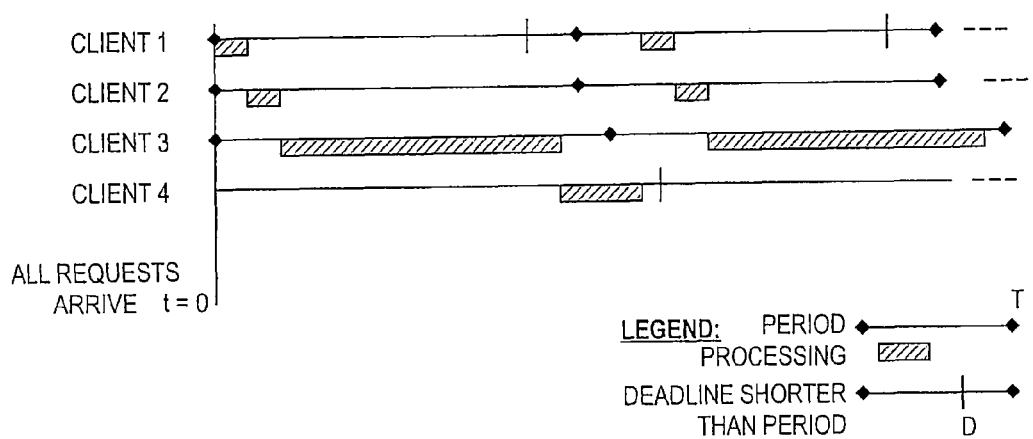

FIGS. 4a-4c illustrate a critical instant analysis timeline with non-preemption in accordance with the present invention. In FIGS. 4a-4c, client 1 has a deadline that is shorter than its period. Client 1 is assigned the highest priority because it has the shortest deadline. Clients 2 and 3 are "normal" clients having periodic requests and deadlines equal to their respective periods. Client 4 has deadlines, but is non-periodic in requesting. Thus client 4 is treated as the worst case wherein requests are initiated after every deadline. Therefore, client 4 is prioritized according to its deadline and its run-time period defaults to its deadline.

The initial conditions for the critical instant analysis of clients 1 and 2 are the same and are shown in FIG. 4a. For both client 1 and client 2, the lower priority client having the longest service time is client 3. Therefore, the critical instant analysis involves the receipt of service requests from clients 1, 2 and 4 at a time t=ε, just after servicing of client 3 begins at a time t=0. After the service time of client 3 elapses, the remaining client devices are serviced in rate monotonic order. Because client 1 finishes its task prior to its deadline, the critical instant analysis of client 1 is a pass. Similarly, because client 2 finishes its task prior to its deadline (which is equivalent to its period), the critical instant analysis of client 2 is a pass.

The initial conditions for the critical instant analysis of client 3 are shown in FIG. 4b. For client 3, the lower priority client having the longest service time is client 4. Therefore, the critical instant analysis involves the receipt of service requests from clients 1, 2 and 3 at a time t=F, just after servicing of client 4 begins at a time t=0. After the service time of client 4 elapses, the remaining client devices are serviced in rate monotonic order. As can be seen in FIG. 4b, client 3 fails to complete its transaction with the shared resource by the end of its period, as a result of excessive blocking from client 4. Therefore, the critical instant analysis of client 3 is a fail.

The initial conditions for the critical instant analysis of client 4 are shown in FIG. 4c. There are no blocking clients for client 4, because client 4 is the lowest priority client. Therefore, the critical instant analysis involves the simultaneous receipt of service requests from all clients 1, 2, 3 and 4 at a time t=0 and the client devices are serviced in rate monotonic order. As can be seen in FIG. 4c, client 4 completes its transaction with the shared resource by its deadline. Therefore, the critical instant analysis of client 4 is a pass.

Because all clients must pass their critical instant analyses in order for a non-preemptive system to be declared schedulable, the system analyzed in FIGS. 4a-4c is declared unschedulable according to the present invention, because client 3 fails its critical instant test, as shown in FIG. 4b.

Figure 5:
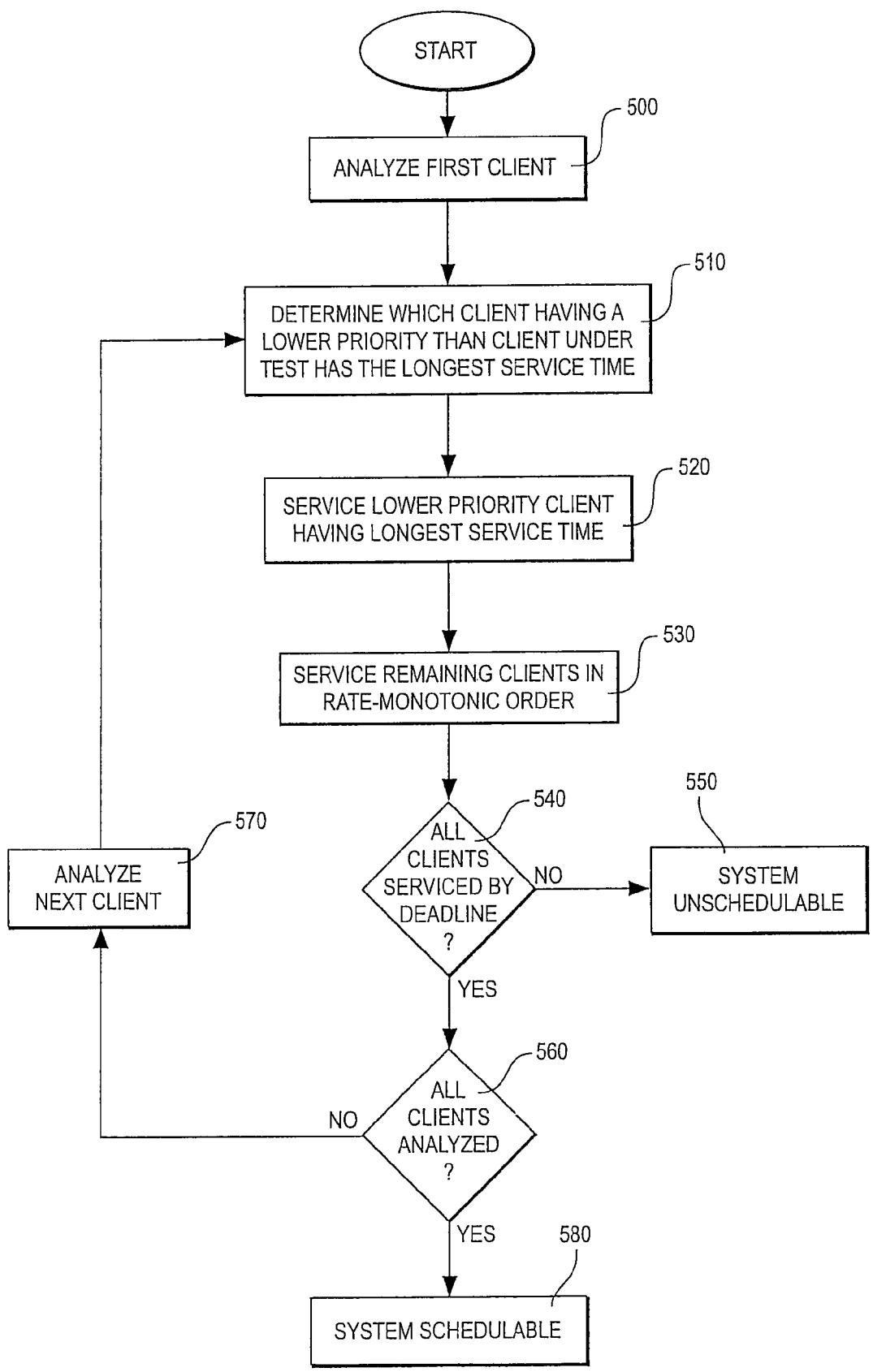
FIG. 5 is a flowchart representing a method of analyzing the schedulability of a non-preemptive system that employs rate monotonic scheduling according to an illustrative embodiment of the present invention.

FIG. 5 is a flowchart representing a method of analyzing the schedulability of a non-preemptive system that employs rate monotonic scheduling according to an illustrative embodiment of the present invention. At step 500, a first of a plurality of client devices undergoes critical instant analysis. The first step of the analysis of the client is step 510. At step 510, it is determined which client device having a lower priority than the client under test has the longest service time. At step 520, the lower priority client having the longest service time is serviced by the common resource. At step 530, when the servicing of the lower priority client having the longest service time is completed, the remaining clients are serviced by the common resource in rate-monotonic order. At decision box 540, it is determined whether, in the present analysis with respect to the client device being presently analyzed, all of the clients are serviced by their respective service deadlines. If any of the clients are not completely serviced by their service deadline, the system is declared unschedulable, as indicated at step 550. If all of the clients are serviced by their respective service deadlines, it is determined whether a critical instant analysis has been performed with respect to all clients, as indicated at decision box 560. If all clients have undergone critical instant analysis (and passed), the system is declared schedulable, as shown at step 580. If there remain clients yet to undergo a critical instant analysis, another client is subjected to critical instant analysis, as shown at step 570. As with the previous client, the critical instant analysis begins at step 510.

An illustrative embodiment of the present invention is directed to rules that can be applied to the running of critical instant simulations for non-preemptive systems and that can simplify the critical instant analysis. These are first-order checks to determine if a system is workable. In an illustrative embodiment of the present invention, these first-order checks are not sufficient to say a system works completely. For the following explanation, $P_i$=processing time of client i; $B_i$=blocking time of longest client with priority lower than i; $D_i$=deadline for client i. The highest priority, shortest deadline client is i=1.

Figure 6:
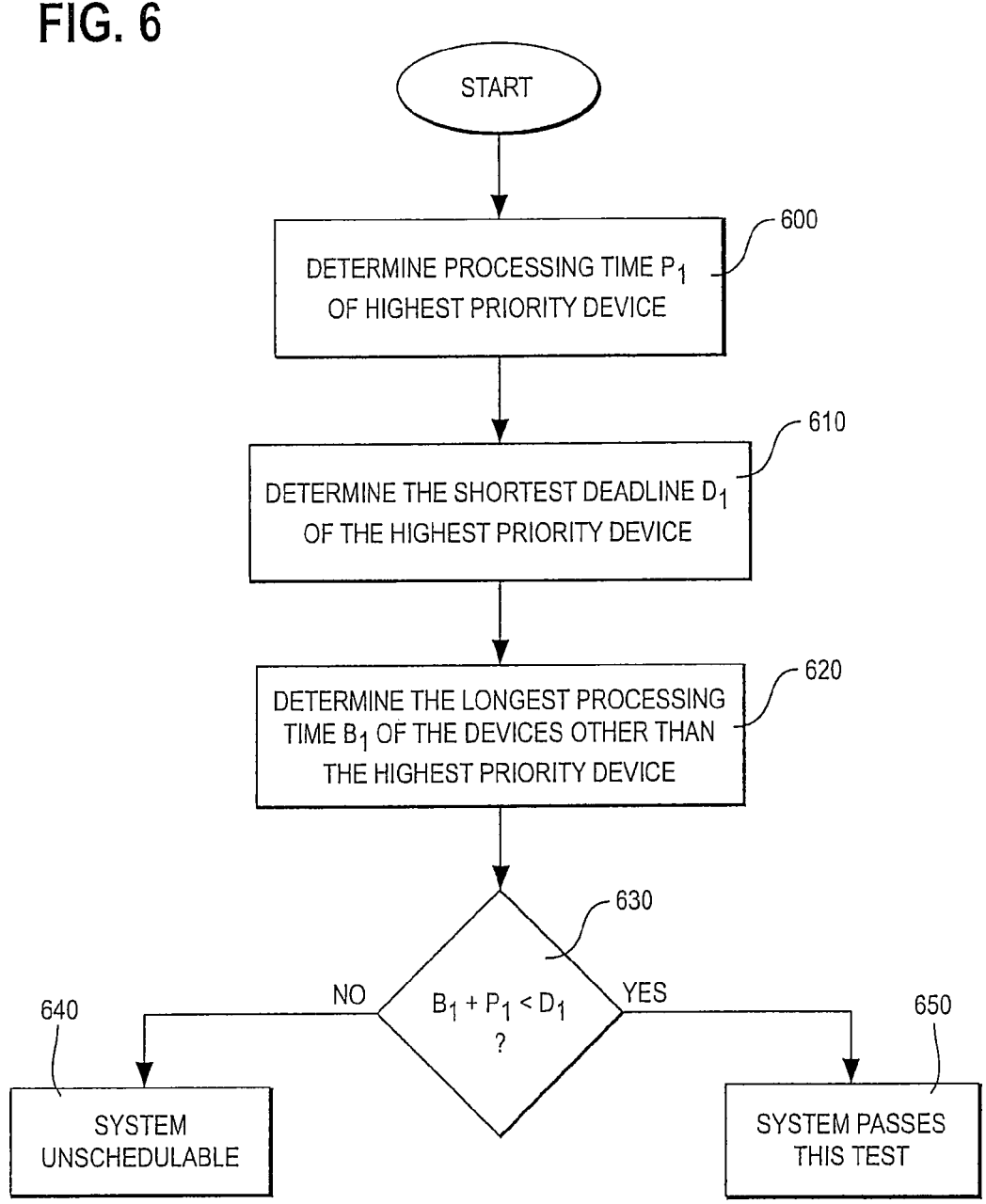
FIG. 6 is a flowchart representing a method of analyzing the schedulability of a non-preemptive system that employs rate monotonic scheduling according to an illustrative embodiment of the present invention.

According to the present invention, the longest service time of all clients other than client 1 (the highest priority client), plus the processing time of client 1, must be shorter than the shortest deadline of client 1. Otherwise, the critical instant analysis will fail and the system will be unschedulable. This rule can be stated mathematically as $B_1+P_1<D_1$. FIG. 6 is a flowchart representing a method of analyzing the schedulability of a non-preemptive system that employs rate monotonic scheduling according to an illustrative embodiment of the present invention. At step 600, the processing time $P_1$ of the client device determined by rate monotonic scheduling to be the highest priority client device is determined. At step 610, the shortest service deadline $D_1$ of the highest priority client device is also determined. At step 620, the longest processing time of the plurality of client devices other than the highest priority client device is also determined (this is the blocking time $B_1$ for client device 1). At decision box 630, it is determined whether the sum of the processing time $P_1$ and the blocking time $B_1$ is less than the shortest deadline $D_1$ of the highest priority client device. If $P_1+B_1<D_1$, the system passes this test, as indicated at step 650. If $P_1+B_1 \geq D_1$, the system is declared unschedulable, as indicated by step 640. In an alternative embodiment of the present invention, the system passes this test if $P_1+B_1 \leq D_1$. If the system passes this test, that does not guarantee that the system is schedulable. Further analysis may need to be performed to determine whether the system is schedulable.

Figure 7:
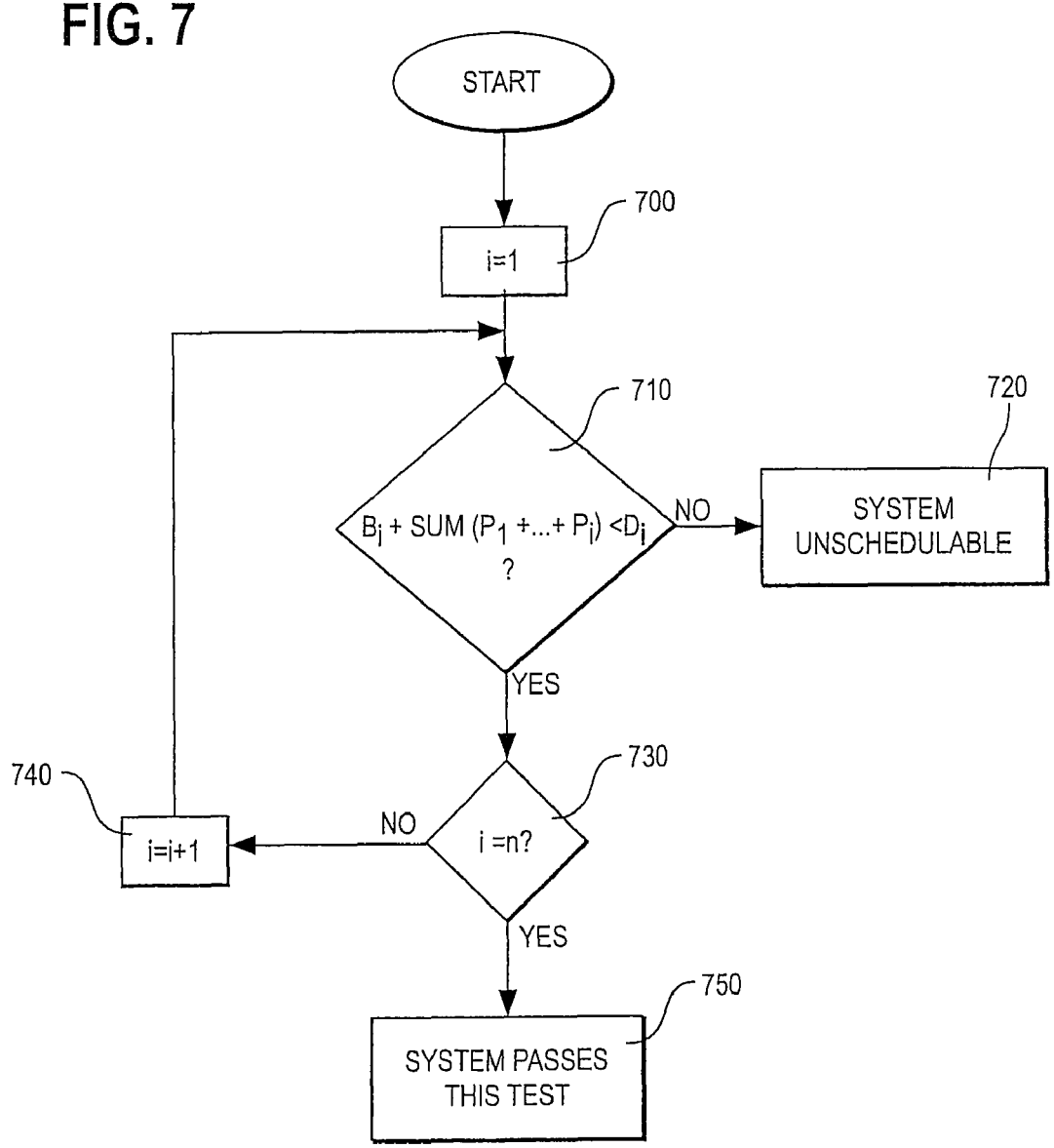
FIG. 7 is a flowchart representing a method of analyzing the schedulability of a non-preemptive system that employs rate monotonic scheduling according to an illustrative embodiment of the present invention.

Additionally, according to one embodiment of the present invention, each client must have a deadline longer than the total service time of all higher priority clients plus the longest blocking time of the lower priority clients. Otherwise, the critical instant analysis will fail and the system will be unschedulable. This rule can be stated mathematically as $B_i+\text{sum}(P_1+\ldots+P_i)<D_i$. FIG. 7 is a flowchart representing a method of analyzing the schedulability of a non-preemptive system that employs rate monotonic scheduling according to an illustrative embodiment of the present invention. At step 700, the client indicator i is initialized at 1. At decision box 710, it is determined whether client i has a deadline longer than the total service time of all higher priority clients plus the longest blocking time of the lower priority clients. If the answer at decision box 710 is no, the system is declared unschedulable. If the answer at decision box 710 is yes, it is determined whether all of the clients have been analyzed, as shown by decision box 730. If all clients have been tested, then the system passes this test, as indicated at step 750. If not all of the clients have been tested, i is incremented, as shown at step 740, and the process is repeated beginning at decision box 710 for the next client. If the system passes this test, that does not guarantee that the system is schedulable. Further analysis may need to be performed to determine whether the system is schedulable. It will be noted that the method represented in FIG. 7 is illustrative only. The client devices may be tested in any order, as long as they are all tested. They need not be tested in descending priority order as shown in FIG. 7.

In practice, the tasks sharing the common resource sometimes do not all exhibit true periodic behavior. Clients having variable periods of request use the worst-case shortest period for critical instant analysis, and for prioritization. This type of behavior is quite poor for a module, and in the extreme may make a system unschedulable. Clients with variable deadlines (if the deadline is shorter than the period) use the shortest worst case deadline for prioritization and critical instant analysis. Clients that have variable service times use the worst-case longest service time for critical instant analysis. This does not have any effect on prioritization, as priority is only a function of deadline. This is commonly an issue for modules which have differing numbers of DRAM page breaks depending on how the data requested is aligned on DRAM pages.

A common type of design which leads to variable behavior is one which does not make requests at a half-full FIFO level, but rather requests as soon as it is serviceable. This type of design generates a large number of small requests, and it is difficult to determine the deadline from the request pattern. The system analysis of such a design is very difficult or impossible in the worst case. This style of design is commonly called a 'leaky bucket' or near-full FIFO design.

In one embodiment of the present invention, a block-out timer, associated with a task that does not normally have a period, is used in order to force a bounded minimum interval, similar to a period, on that task. For example, a block-out timer associated with the CPU is been implemented in an illustrative embodiment of the present invention. If left uncontrolled, the CPU can occupy all available memory cycles, for example by causing a never-ending stream of cache misses and memory requests. At the same time, CPU performance is determined largely by "average latency of memory access," and so the CPU performance would be less than optimal if all CPU memory accessed were consigned to a sporadic server, i.e., at the lowest priority.

In this embodiment, the CPU task has been converted into two logical tasks. A first CPU task has a very high priority for low latency, and it also has a block-out timer associated with it such that once a request by the CPU is made, it cannot submit a request again until the block-out timer has timed out. In this embodiment, the CPU task has the top priority. In other embodiments, the CPU task may have a very high priority but not the top priority. In an illustrative embodiment of the present invention, the timer period is programmable for system tuning, in order to accommodate different system configurations with different memory widths or other options.

In one embodiment of the present invention, the block-out timer is started when the CPU makes a high priority request. In another embodiment, the block-out timer is started when the high priority request by the CPU is serviced. In other embodiments, the block-out timer may be started at any time in the interval between the time the high priority request is made and the time the high priority request is serviced.

A second CPU task is preferably serviced by a sporadic server in a round-robin manner. Therefore if the CPU makes a long string of memory requests, the first one is served as a high priority task, and subsequent requests are served by the low priority sporadic server whenever none of the real-time tasks have requests pending, until the CPU block-out timer times out. For example, the CPU read and write functions are grouped together and treated as two tasks. A first task has a theoretical latency bound of 0 and a period that is programmable via a block-out timer, as described above. A second task is considered to have no period and no deadline, and it is grouped into the set of tasks served by the sporadic server via a round robin at the lowest priority. The CPU uses a programmable block-out timer between high priority requests in this embodiment.

For another example, a graphics display task is considered to have a constant bandwidth of 27 MB/s, i.e., 16 bits per pixel at 13.5 MHz. However, the graphics bandwidth in one embodiment of the present invention can vary widely from much less than 27 MB/s to a much greater figure, but 27 MB/s is a reasonable figure for assuring support of a range of applications. For example, in one embodiment of the present invention, the graphics display task utilizes a block-out timer that enforces a period of 2.37 µs between high priority requests, while additional requests are serviced on a best-effort basis by the sporadic server in a low priority round robin manner.

Figure 8:
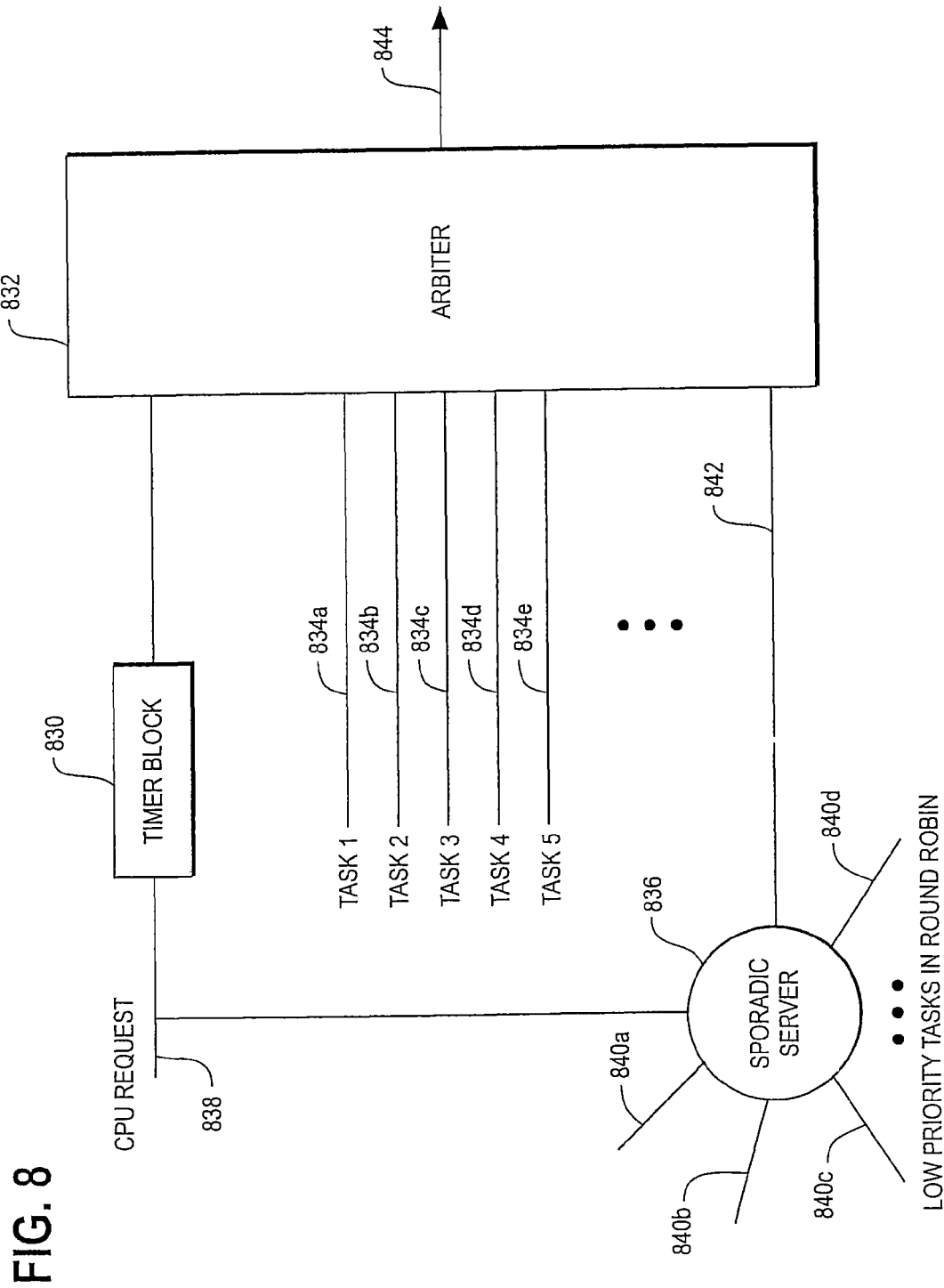
FIG. 8 is a functional block diagram representing a memory controller system according to an illustrative embodiment of the present invention.

Referring to FIG. 8, a block diagram illustrates an implementation of a real-time scheduling using an RMS methodology. A CPU service request 838 is preferably coupled to an input of a block-out timer 830 and a sporadic server 836. An output of the block-out timer 830 is preferably coupled to an arbiter 832 as a high priority service request. Tasks 1-5 834a-e may also be coupled to the arbiter as inputs. An output of the arbiter is a request for service of a task that has the highest priority among all tasks that have a pending memory request.

In FIG. 8, only the CPU service request 838 is coupled to a block-out timer. In other embodiments, service requests from other tasks may be coupled to their respective block-out timers. The block-out timers are used to enforce a minimum interval between two successive accesses by any high priority task that is non-periodic but may require expedited servicing. Two or more such high priority tasks may be coupled to their respective block-out timers in one embodiment of the present invention. Devices that are coupled to their respective block-out timers as high priority tasks may include a graphics accelerator, a display engine, and other devices.

In addition to the CPU request 838, low priority tasks 840a-d may be coupled to the sporadic server 836. In the sporadic server, these low priority tasks are handled in a round robin manner. The sporadic server sends a memory request 842 to the arbiter for the next low priority task to be serviced.

Figure 9:
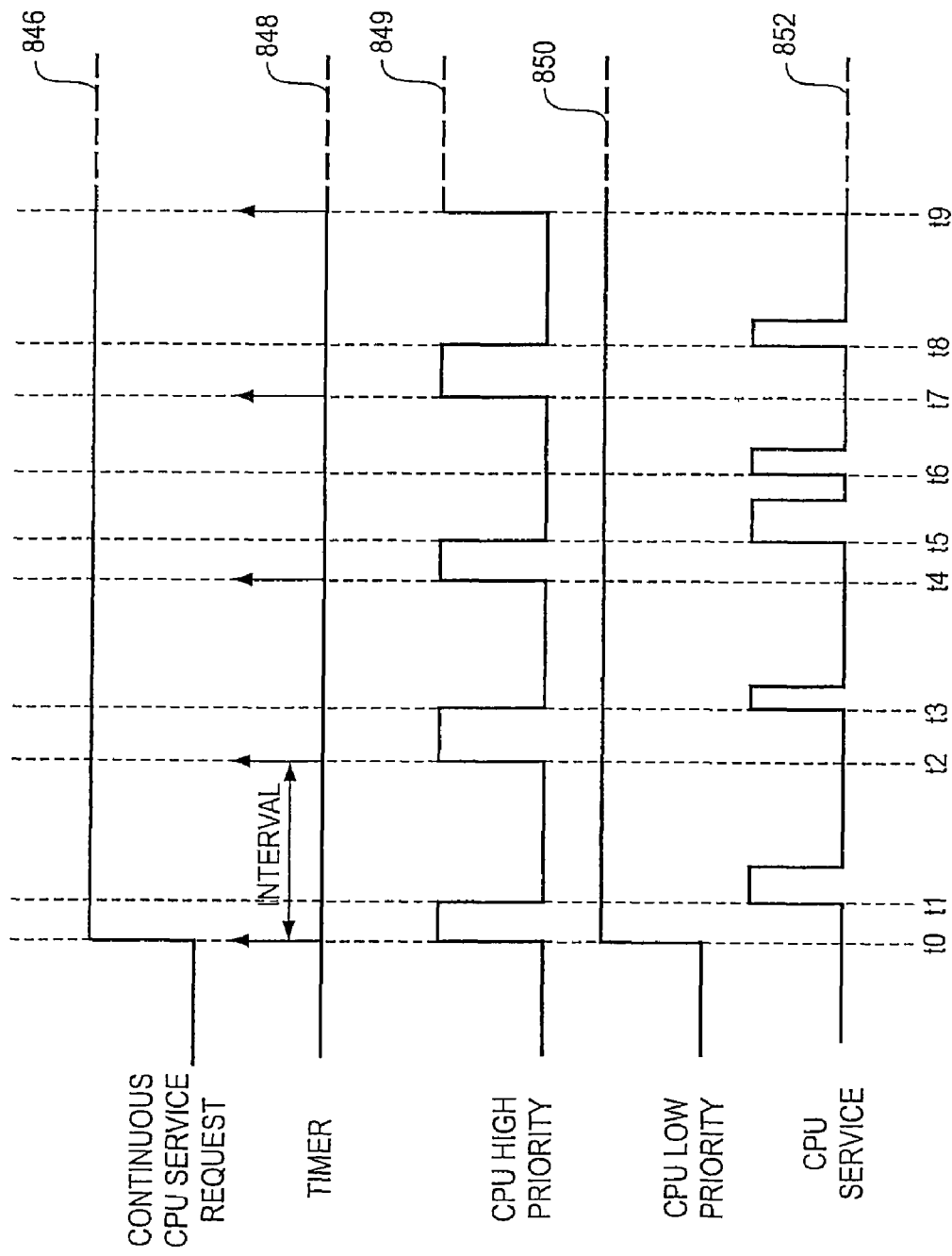
FIG. 9 is a timeline representing the operation of a block-out timer according to an illustrative embodiment of the present invention.

Referring to FIG. 9, a timing diagram illustrates CPU service requests and services in case of a continuous CPU request 846. In practice, the CPU request is generally not continuous, but FIG. 9 has been provided for illustrative purposes. In the example represented in FIG. 9, a block-out timer 848 is started upon a high priority service request 849 by the CPU. At time $t_o$, the CPU starts making the continuous service request 846, and a high priority service request 849 is first made provided that the block-out timer 848 is not running at time $t_o$. When the high priority service request is made, the block-out timer 848 is started. Between time $t_o$ and time $t_1$, the memory controller finishes servicing a memory request from another task. The CPU is first serviced at time $t_1$. In the preferred embodiment, the duration of the block-out timer is programmable. For example, the duration of the block-out timer may be programmed to be 3 µs.

Any additional high priority CPU request 849 is blocked out until the block-out timer times out at time $t_2$. Instead, the CPU low priority request 850 is handled by a sporadic server in a round robin manner between time $t_1$ and time $t_2$. The low priority request 850 is active as long as the CPU service request is active. Since the CPU service request 846 is continuous, another high priority service request 849, is made by the CPU and the block-out timer is started again as soon as the block-out timer times out at time $t_2$. The high priority service request made by the CPU at time $t_2$ is serviced at time $t_3$ when the memory controller finishes servicing another task. Until the block-out timer times out at time $t_4$, the CPU low priority request 850 is handled by the sporadic server while the CPU high priority request 849 is blocked out.

Another high priority service request is made and the block-out timer 848 is started again when the block-out timer 848 times out at time $t_4$. At time $t_5$, the high priority service request 849 made by the CPU at time $t_4$ is serviced. The block-out timer does not time out until time $t_7$. However, the block-out timer is not in the path of the CPU low priority service request and, therefore, does not block out the CPU low priority service request. Thus, while the block-out timer is still running, a low priority service request made by the CPU is handled by the sporadic server, and serviced at time $t_6$.

When the block-out timer 848 times out at time $t_7$, it is started again and yet another high priority service request is made by the CPU, since the CPU service request is continuous. The high priority service request 849 made by the CPU at time $t_7$ is serviced at time $t_8$. When the block-out timer times out at time $t_9$, the high priority service request is once again made by the CPU and the block-out timer is started again.

The schedule that results from the task set and priorities above is verified by simulating the system performance starting from the critical instant, when all tasks request service at the same time and a previously started low priority task is already underway. The system is proven to meet all the real-time deadlines if all of the tasks with real-time deadlines meet their deadlines. Of course, in order to perform this simulation accurately, all tasks make new requests at every repetition of their periods, whether or not previous requests have been satisfied.

In an illustrative embodiment of the present invention, the effects of bus latency and delays in communication from the module to the memory (or other shared resource) and return are deducted from the deadline of the module to give an effective service deadline that is seen by the shared resource. This does not change the period of the requests as modeled in the critical instant. It may, however change the priority of a module since the prioritization is based on the deadline if the module's deadline is shorter than its period. For example, if a system has four client devices with respective service deadlines of 2 µs, 5 µs, 10 µs and 10 µs, and the bus connecting each client to the shared resource has a round trip latency of 1 µs, then according to the present invention, the effective deadlines seen by the shared resource will be 1 µs, 4 µs, 9 µs and 9 µs, for the respective client devices.

Figure 10:
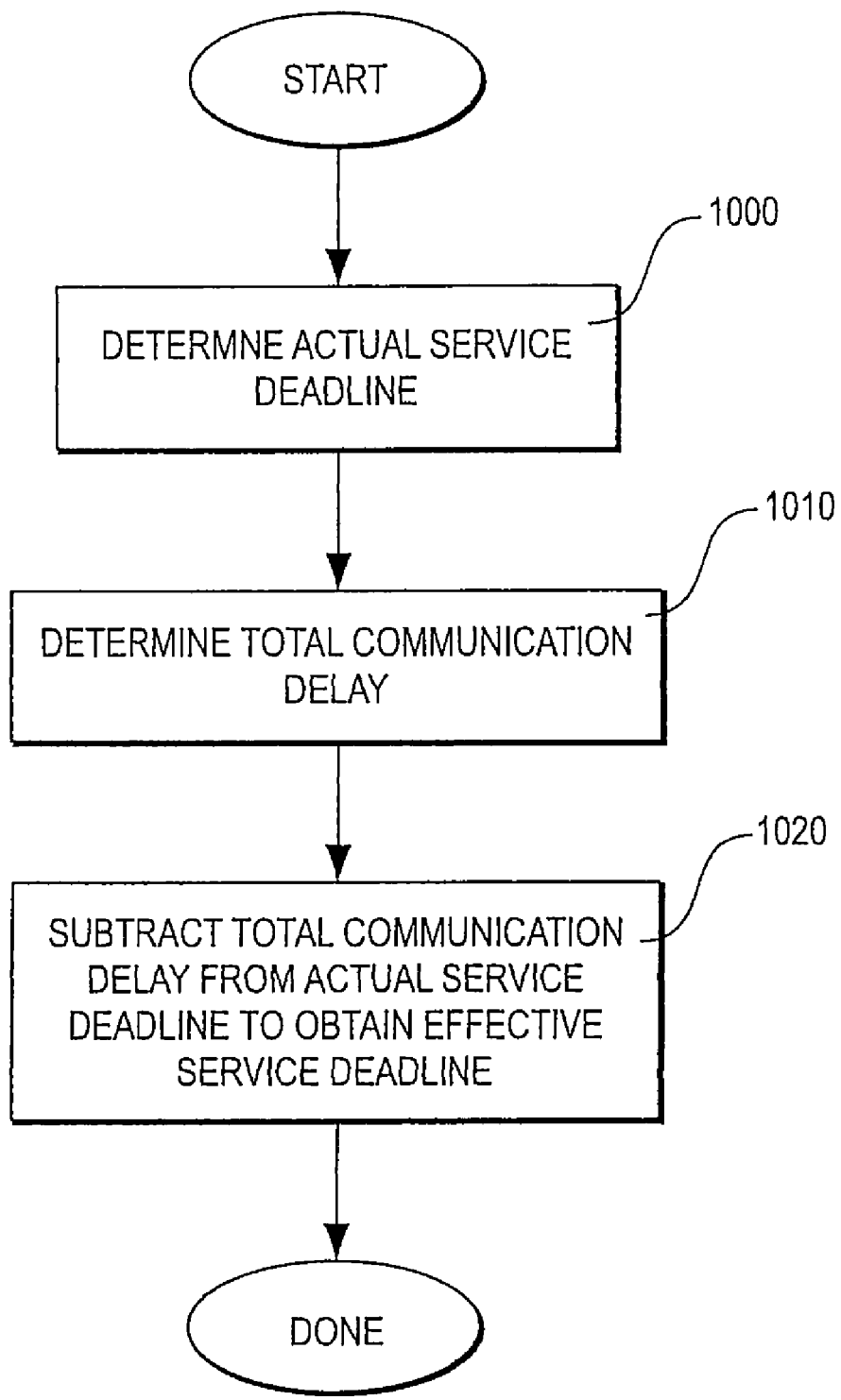
FIG. 10 is a flowchart representing a method of determining an effective service deadline of a client device in a system that employs rate monotonic scheduling according to an illustrative embodiment of the present invention.

FIG. 10 is a flowchart representing a method of determining an effective service deadline of a client device in a system that employs rate monotonic scheduling. At step 1000, the actual service deadline of the client device is determined. At step 1010, the total communication delay between the client device and the shared resource is determined. At step 1020, the total communication delay is subtracted from the actual service deadline to obtain an effective service deadline. In an illustrative embodiment of the present invention, the rate-monotonic priorities of the client devices are determined using the effective service deadline of the client devices. Also, in an illustrative embodiment, the total communication delay is the sum of the communication delay from the client device to the shared resource and the communication delay from the shared resource to the client device.

Referring again to FIG. 1 in one embodiment of the present invention, the arbiter 110 utilizes a pipeline stage for arbitration of clients prior to issuing a command to the memory controller 120. In an illustrative embodiment, this pipeline initiates an arbitration calculation at the time a command is issued to the memory controller 120, so that there is always one command in process by the memory controller 120, and one command arbitrated and waiting in the pipeline. In an illustrative embodiment, if new client requests arrive of higher priority, they will not dislodge the command in the arbitration pipeline.

The arbitration pipeline described above may have an impact on the initial conditions of the critical instant analysis, as there are, in the worst case, two commands in the pipeline ahead of the critical requests, causing two blocking tasks in the critical instant. Therefore, according to an exemplary embodiment of the present invention, for any client, the worst case critical instant includes a blocking time equal to the two longest service time clients of lower priority. In the case of a round robin sporadic server, it is possible that the two longest service time blocking clients could both be in the non-real time round robin loop.

Figure 11:
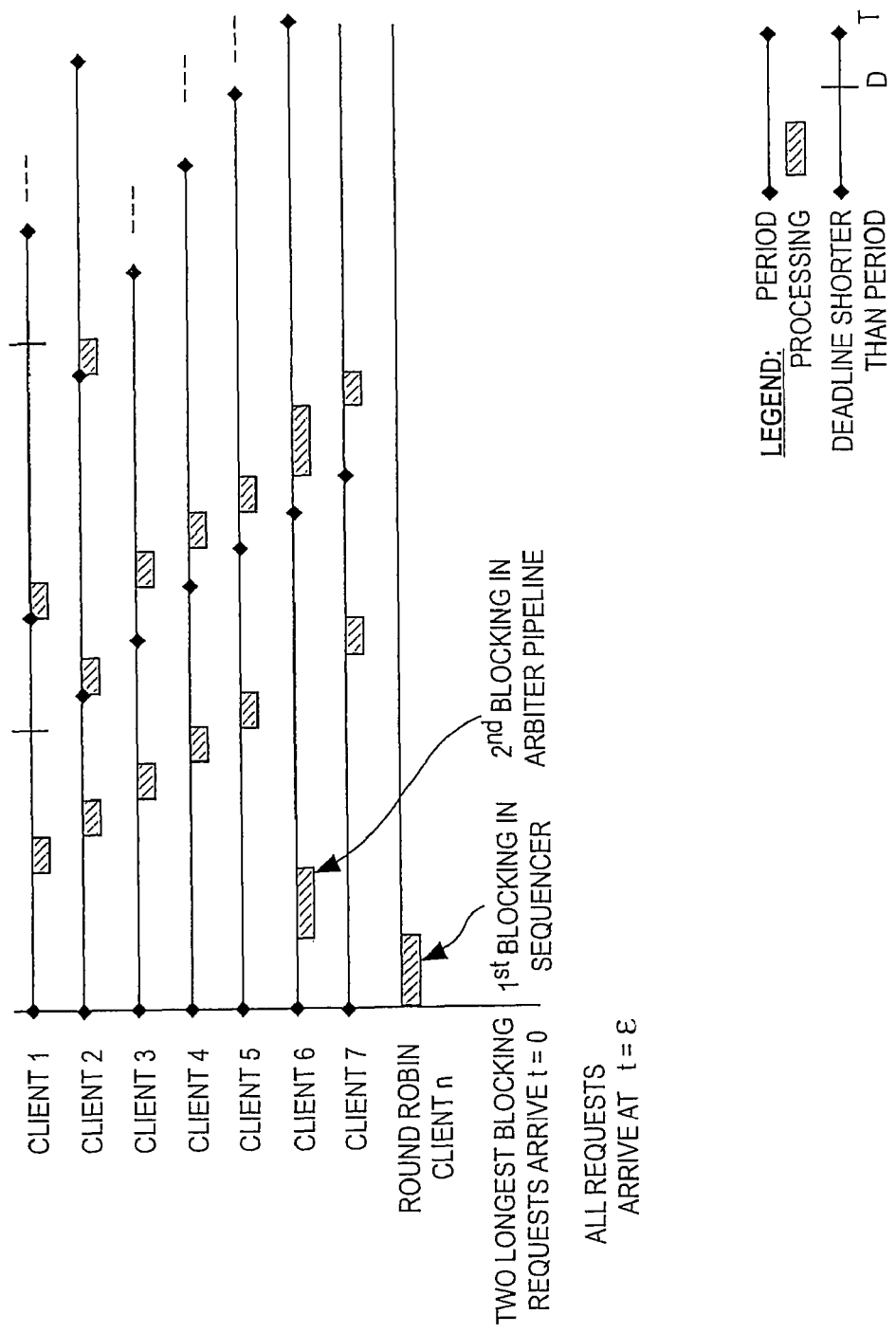
FIG. 11 illustrates a diagram of one embodiment of multiple blocking clients in an arbitration pipeline timeline in accordance with the present invention.

FIG. 11 is a timeline depicting an exemplary critical instant analysis with various types of clients in a system employing an arbitration pipeline according to an illustrative embodiment of the present invention. In FIG. 11, client 1 has a deadline that is shorter than its period. Client 1 is assigned the highest priority because it has the shortest deadline. Clients 2-7 are "normal" clients having periodic requests and deadlines equal to their respective periods. FIG. 11 shows the initial conditions for the critical instant analysis for clients 1-5. For each of clients 1-5, the lower priority clients having the longest service times are client 6 and round robin client n. Therefore, client 6 and round robin client n are treated as the blocking clients that block the service of clients 1-5. Thus the critical instant analysis involves the receipt of service requests from clients 1-5 and client 7 at a time t=ε, just after receiving requests from client 6 and round robin client n at a time t=0. After the combined service time of client 5 and blocking client n elapses, the remaining client devices are serviced in rate monotonic order. Because clients 1-5 all finish their transactions with the shared resource prior to their respective deadlines, the critical instant analyses of client 1-5 are all passing.

Figure 12:
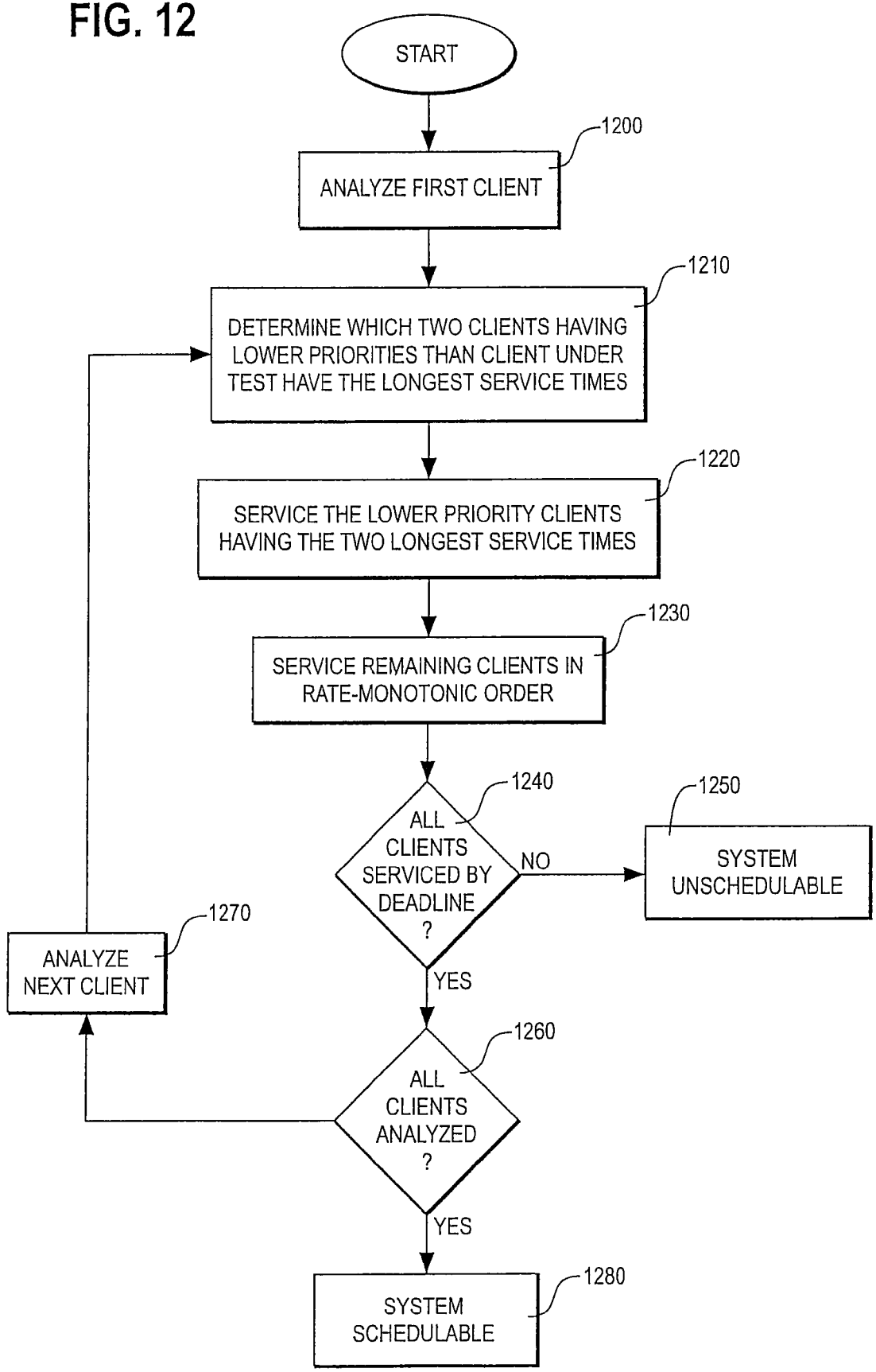
FIG. 12 is a flowchart representing a method of analyzing the schedulability of a system that employs rate monotonic scheduling, wherein the system initiates an arbitration when a previously arbitrated command is issued to the common resource for processing, according to an illustrative embodiment of the present invention.

FIG. 12 is a flowchart representing a method of analyzing the schedulability of a system that employs rate monotonic scheduling, wherein the system initiates an arbitration when a previously arbitrated command is issued to the common resource for processing, according to an illustrative embodiment of the present invention. At step 1200, a first of a plurality of client devices undergoes critical instant analysis. The first step of the analysis of the client is step 1210. At step 1210, it is determined which two client devices having a lower priority than the client under test have the two longest service times. At step 1220, the two lower priority clients having the two longest service times are serviced by the common resource. At step 1230, when the servicing of the two lower priority clients having the two longest service times is completed, the remaining clients are serviced by the common resource in rate-monotonic order. At decision box 1240, it is determined whether, in the present analysis with respect to the client device being presently analyzed, all of the clients are serviced by their respective service deadlines. If any of the clients are not completely serviced by their service deadline, the system is declared unschedulable, as indicated at step 1250. If all of the clients are serviced by their respective service deadlines, it is determined whether a critical instant analysis has been performed with respect to all clients, as indicated at decision box 1260. If all clients have undergone critical instant analysis (and passed), the system is declared schedulable, as shown at step 1280. If there remain clients yet to undergo a critical instant analysis, another client is subjected to critical instant analysis, as shown at step 1270. As with the previous client, the critical instant analysis begins at step 1210.

Figure 13:
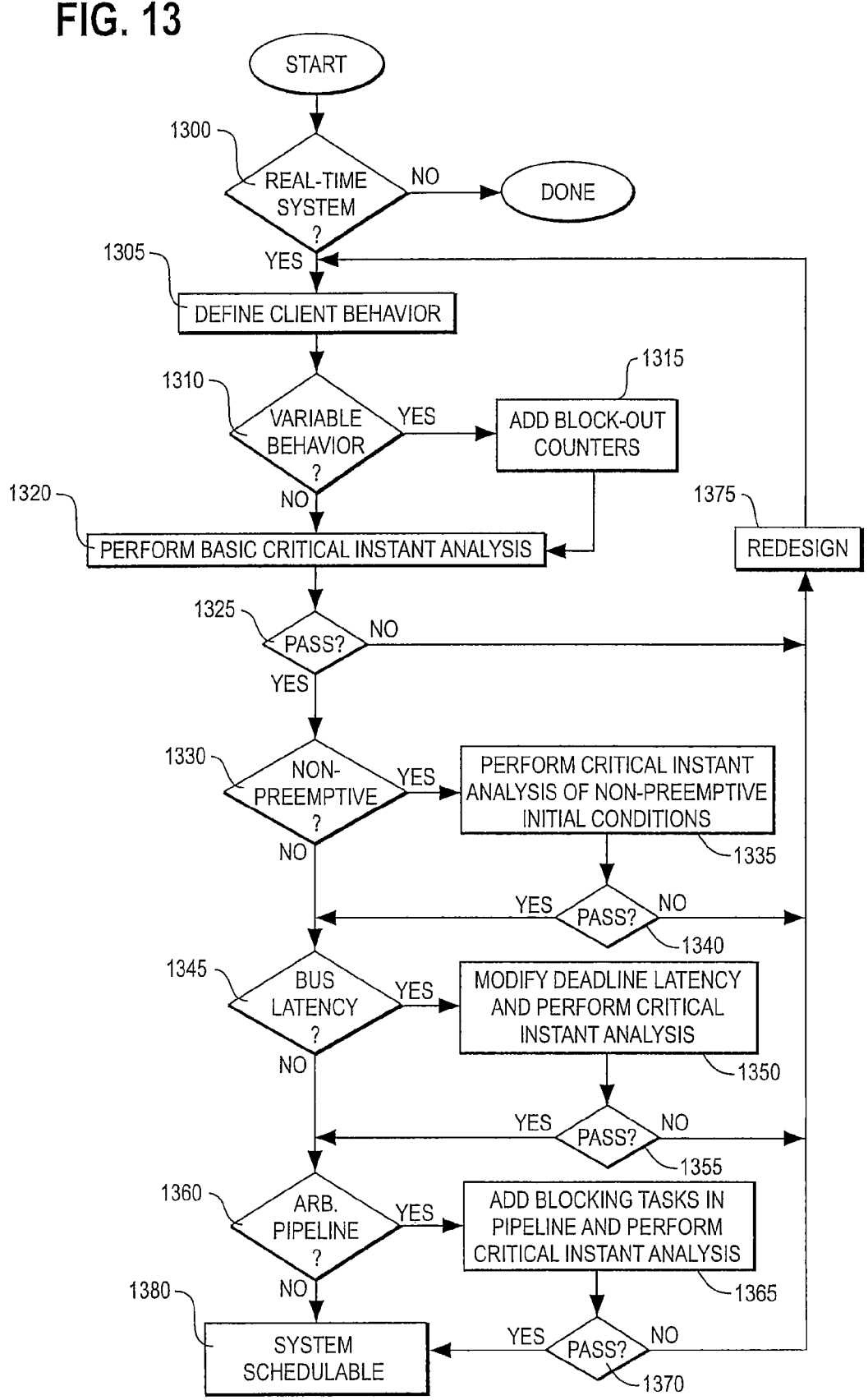
FIG. 13 is a flowchart representing a method of analyzing the schedulability of a system that employs rate monotonic scheduling according to an illustrative embodiment of the present invention.

FIG. 13 is a flowchart representing a method of analyzing the schedulability of a system that employs rate monotonic scheduling according to an illustrative embodiment of the present invention. FIG. 13 incorporates many of the analysis techniques described previously herein. At decision block 1300, it is determined whether the system is a real-time system. If it is not a real-time system, the analysis represented in FIG. 13 is not performed. Some other method of analyzing a non-real-time system may be employed.

If the system is a real-time system, the client behavior is defined, as shown at step 1305. That is, the periods, service deadlines, service times, etc., are determined for each of the client devices. At decision box 1310, it is determined whether any of the clients exhibit variable behavior, that is, whether they have irregular periods of request, irregular service deadlines or irregular service times. If any of the clients do exhibit variable behavior, block-out counters are employed with respect to those clients, as shown by step 1315. At step 1320, a basic critical instant analysis is performed on the system. At decision box 1325, if the system fails the critical instant analysis, the system is redesigned, as shown by step 1375, and re-analyzed starting at step 1305.

If the system passes the basic critical instant analysis, it is determined whether the system is non-preemptive, as shown at decision box 1330. If it is non-preemptive, a critical instant analysis is performed on the system using the initial conditions prescribed by the present invention with respect to, for example, FIGS. 4a-4c and FIG. 5, as shown at step 1335. At decision box 1340, if the system fails the critical instant test, the system is redesigned, as shown by step 1375, and re-analyzed starting at step 1305.

If the system passes the critical instant test of step 1335, or if the system is preemptive, it is determined whether there is bus latency between the client devices and the common resource, as shown at decision box 1345. Alternatively, at decision box 1345 it is determined whether it is desired to account for such bus latency. If there is bus latency that is to be accounted for, the effective deadlines of the client devices from the point of view of the shared resource are determined and the priorities of the various client devices are determined according to these effective deadlines, as prescribed by the present invention with respect to, for example, FIG. 10. A critical instant analysis is then performed using the effective deadlines and the corresponding effective priorities, as shown at step 1350. At decision box 1355, if the system fails the critical instant test, the system is redesigned, as shown by step 1375, and re-analyzed starting at step 1305.

If the system passes the critical instant test of step 1350, or if it is not desired to compensate for bus latency, it is determined whether the system employs an arbitration pipeline wherein the system initiates an arbitration when a previously arbitrated command is issued to the common resource for processing, as shown at decision box 1360. If the system does employ such an arbitration pipeline, a critical instant analysis is performed on the system using the initial conditions prescribed by the present invention with respect to, for example, FIGS. 11 and 12, as shown by step 1365. At decision box 1370, if the system fails the critical instant test, the system is redesigned, as shown by step 1375, and re-analyzed starting at step 1305. If the system passes the critical instant test, or if the system does not employ an arbitration pipeline, the system is declared schedulable, as shown at step 1380.

In the embodiment of the present invention heretofore described, the clients are hardware devices and the shared resource is a hardware device such as a memory element. In an alternative embodiment of the present invention, the clients are software clients and the shared resource is a CPU.

Although a preferred embodiment of the present invention has been described, it should not be construed to limit the scope of the appended claims. For example, the present invention may be employed with any type of resource that is shared among a plurality of clients, in addition to the shared memory module illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

The invention claimed is:

1. A computer-implemented method of analyzing the schedulability of a non-preemptive system that employs rate monotonic scheduling to determine access priority of a plurality of clients to a common resource, each client having an associated processing time, the method comprising:
    (a) determining, with a data processing element, a shortest service deadline of a preselected one of the clients;
    (b) determining, with the data processing element, a longest processing time of any of the plurality of clients having a lower priority than the preselected client according to rate monotonic scheduling;
    (c) adding, with the data processing element, the processing times of all of the clients having a higher priority than the preselected client to obtain a combined processing time of the higher priority clients; and
    (d) declaring the system unschedulable if the sum of the longest processing time of the clients having a lower priority than the preselected client and the combined processing time of the higher priority clients is greater than the shortest deadline of the preselected client.

2. The method of claim 1 wherein once servicing of a client is initiated, that client is serviced until completion.

3. The method of claim 1 wherein the processing time for a given client is the time required for the common resource to process a request of the given client once access to the common resource is granted.

4. The method of claim 1 wherein a service deadline of a given client is the point in time by which the client needs an operation requested of the common resource to be completed.

5. The method of claim 1 wherein the clients are hardware devices.

6. The method of claim 5 wherein the common resource is a memory element.

7. The method of claim 1 wherein the clients are software clients.

8. The method of claim 7 wherein the common resource is a CPU.

9. A machine-readable storage, having stored thereon a computer program having a plurality of code sections for implementing a method of analyzing the schedulability of a non-preemptive system that employs rate monotonic scheduling to determine access priority of a plurality of clients to a common resource, each client having an associated processing time, the code sections executable by a machine for causing the machine to perform operations comprising:
    (a) determining a shortest service deadline of a preselected one of the clients;
    (b) determining a longest processing time of any of the plurality of clients having a lower priority than the preselected client according to rate monotonic scheduling;
    (c) adding the processing times of all of the clients having a higher priority than the preselected client to obtain a combined processing time of the higher priority clients; and
    (d) declaring the system unschedulable if the sum of the longest processing time of the clients having a lower priority than the preselected client and the combined processing time of the higher priority clients is greater than the shortest deadline of the preselected client.

10. The machine-readable storage of claim 9 wherein once servicing of a client is initiated, that client is serviced until completion.

11. The machine-readable storage of claim 9 wherein the processing time for a given client is the time required for the common resource to process a request of the given client once access to the common resource is granted.

12. The machine-readable storage of claim 9 wherein a service deadline of a given client is the point in time by which the client needs an operation requested of the common resource to be completed.

13. The machine-readable storage of claim 9 wherein the clients are hardware devices.

14. The machine-readable storage of claim 13 wherein the common resource is a memory element.

15. The machine-readable storage of claim 9 wherein the clients are software clients.

16. The machine-readable storage of claim 15 wherein the common resource is a CPU.

17. A computer-implemented method of analyzing the schedulability of a non-preemptive system that employs rate monotonic scheduling to determine access priority of a plurality of clients to a common resource, each client having an associated processing time, the method comprising:
    (a) determining, with a data processing element, a shortest service deadline of a preselected one of the clients;
    (b) determining, with the data processing element, a longest processing time of any of the plurality of clients having a lower priority than the preselected client according to rate monotonic scheduling;
    (c) adding, with the data processing element, the processing times of all of the clients having a higher priority than the preselected client to obtain a combined processing time of the higher priority clients;
    (d) determining, with the data processing element, whether the system is schedulable based on the sum of the longest processing time of the clients having a lower priority than the preselected client and the combined processing time of the higher priority clients; and
    (e) determining, with the data processing element, that the system is unschedulable if the sum of the longest processing time of the clients having a lower priority than the preselected client and the combined processing time of the higher priority clients is greater than the shortest deadline of the preselected client.

18. The method of claim 17 wherein once servicing of a client is initiated, that client is serviced until completion.

19. The method of claim 17 wherein the processing time for a given client is the time required for the common resource to process a request of the given client once access to the common resource is granted.

20. The method of claim 17 wherein a service deadline of a given client is the point in time by which the client needs an operation requested of the common resource to be completed.

* * * * *